(12) United States Patent
Carter et al.

(10) Patent No.: US 9,977,120 B2
(45) Date of Patent: May 22, 2018

(54) METHOD AND APPARATUS FOR PRODUCING AN ACOUSTIC FIELD

(71) Applicant: Ultrahaptics IP Ltd, Bristol (GB)

(72) Inventors: Thomas Andrew Carter, Bristol (GB); Benjamin John Oliver Long, Bristol (GB); Sriram Subramanian, Bristol (GB)

(73) Assignee: Ultrahaptics IP Ltd, Bristol (GB)

( * ) Notice: Subject to any disclaimer, the term of this patent is extended or adjusted under 35 U.S.C. 154(b) by 200 days.

(21) Appl. No.: 14/889,128

(22) PCT Filed: Apr. 29, 2014

(86) PCT No.: PCT/GB2014/051319
§ 371 (c)(1),
(2) Date: Nov. 4, 2015

(87) PCT Pub. No.: WO2014/181084
PCT Pub. Date: Nov. 13, 2014

(65) Prior Publication Data
US 2016/0124080 A1 May 5, 2016

(30) Foreign Application Priority Data
May 8, 2013 (GB) .................................. 1308274.8

(51) Int. Cl.
*G01S 15/00* (2006.01)
*G01S 7/52* (2006.01)
(Continued)

(52) U.S. Cl.
CPC ...... *G01S 7/52004* (2013.01); *G01S 7/52003* (2013.01); *G01S 7/539* (2013.01);
(Continued)

(58) Field of Classification Search
CPC .... G01S 7/52004; G01S 15/876; G01S 15/36; G01S 7/52003; G01S 7/539; G01S 2007/52007; H04S 7/30
See application file for complete search history.

(56) References Cited

U.S. PATENT DOCUMENTS 4,218,921 A 8/1980 Oran et al.
6,503,204 B1 1/2003 Sumanaweera et al.
(Continued)

FOREIGN PATENT DOCUMENTS

GB 2464117 A 4/2010
GB 2530036 3/2016
(Continued)

OTHER PUBLICATIONS

Search report and Written Opinion of ISA for PCT/GB2015/050417 dated Jul. 8, 2016.
(Continued)

*Primary Examiner* — Hovhannes Baghdasaryan
(74) *Attorney, Agent, or Firm* — Koffsky Schwalb LLC; Mark I. Koffsky

(57) ABSTRACT

A plurality of control points are defined having a known spatial relationship relative to an array of transducers. An amplitude is assigned to each control point. A matrix is produced containing elements which represent, for each of the control points, the effect that producing a modeled acoustic field having the assigned amplitude with a particular phase at the control point has on the consequential amplitude and phase of the modeled acoustic field at the other control points. Eigenvectors of the matrix are determined, each eigenvector representing a set of phases and relative amplitudes of the modeled acoustic field at the control points. One of the sets is selected and the transducer array is operated to cause one or more of the transducers to output an acoustic wave each having an initial amplitude and
(Continued)

phase such that the phases and amplitudes of the resultant acoustic field at the control points correspond to the phases and relative amplitudes of the selected set.

19 Claims, 4 Drawing Sheets

(51) Int. Cl.
    *H04S 7/00*           (2006.01)
    *G01S 7/539*         (2006.01)
    *G01S 15/36*         (2006.01)
    *G01S 15/87*         (2006.01)

(52) U.S. Cl.
    CPC ............ *G01S 15/36* (2013.01); *G01S 15/876* (2013.01); *H04S 7/30* (2013.01); *G01S 2007/52007* (2013.01)

(56) References Cited

U.S. PATENT DOCUMENTS

| | | | |
|---|---|---|---|
| 7,225,404 B1 | 5/2007 | Zilles et al. | |
| 8,884,927 B1 | 11/2014 | Cheatham, III | |
| 9,208,664 B1 | 12/2015 | Peters et al. | |
| 2003/0144032 A1* | 7/2003 | Brunner | H04B 7/0634 455/562.1 |
| 2004/0014434 A1* | 1/2004 | Haardt | H04B 7/0617 455/103 |
| 2004/0091119 A1* | 5/2004 | Duraiswami | H04S 1/002 381/26 |
| 2006/0085049 A1 | 4/2006 | Cory et al. | |
| 2007/0177681 A1* | 8/2007 | Choi | H04B 7/0417 375/260 |
| 2008/0012647 A1 | 1/2008 | Risbo et al. | |
| 2008/0273723 A1* | 11/2008 | Hartung | H04R 1/403 381/302 |
| 2009/0093724 A1 | 4/2009 | Pernot et al. | |
| 2010/0103246 A1 | 4/2010 | Schwerdtner | |
| 2010/0013613 A1 | 10/2010 | Weston | |
| 2010/0262008 A1 | 10/2010 | Roundhill | |
| 2011/0051554 A1 | 3/2011 | Varray et al. | |
| 2011/0199342 A1 | 8/2011 | Vartanian et al. | |
| 2011/0310028 A1 | 12/2011 | Camp, Jr. | |
| 2012/0063628 A1 | 3/2012 | Rizzello | |
| 2012/0229401 A1 | 9/2012 | Birnbaum et al. | |
| 2012/0299853 A1 | 11/2012 | Dagar | |
| 2012/0307649 A1* | 12/2012 | Park | H04B 7/0413 370/241 |
| 2012/0315605 A1 | 12/2012 | Cho | |
| 2013/0035582 A1 | 2/2013 | Radulescu | |
| 2014/0168091 A1 | 6/2014 | Jones | |
| 2015/0006645 A1 | 3/2015 | Lin et al. | |
| 2015/0070147 A1 | 3/2015 | Cruz-Hernandez et al. | |
| 2015/0070245 A1 | 3/2015 | Han et al. | |
| 2015/0110310 A1* | 4/2015 | Minnaar | H04R 5/00 381/307 |
| 2015/0013023 A1 | 5/2015 | Harris et al. | |
| 2015/0220199 A1 | 8/2015 | Wang | |
| 2015/0226831 A1* | 8/2015 | Nakamura | G01S 3/8006 367/118 |
| 2015/0304789 A1 | 10/2015 | Babayoff et al. | |
| 2016/0044417 A1 | 2/2016 | Clemen | |
| 2016/0189702 A1 | 6/2016 | Blanc et al. | |
| 2017/0004819 A1 | 1/2017 | Ochiai | |

FOREIGN PATENT DOCUMENTS

| | | |
|---|---|---|
| JP | 201248378 | 3/2012 |
| KR | 20130055972 | 5/2013 |
| KR | 20160008280 | 1/2016 |
| WO | 96/39754 | 12/1996 |
| WO | 2015/039622 | 3/2015 |

OTHER PUBLICATIONS

Search report and Written Opinion of ISA for PCT/GB2015/050421 dated Jul. 8, 2016.
Search Report for PCT/GB2017/050012 dated Jun. 8, 2017.
Martinez-Graullera et al., 2D array design based on Fermat spiral for ultrasonic imaging, Ultrasonics 50 (2010) 280-89.
Marzo et al., Holographic acoustic elements for manipulation of levitated objects, Nature Communications DOI: 10.1038/ncomms9661 (2015).
Iwamoto et al. (2006), Two-dimensional Scanning Tactile Display using Ultrasonic Radiation Pressure, Symposium of Haptic Interfaces for Virtual Environment and Teleoperator Systems, pp. 57-61.
Iwamoto et al. (2008), Non-contact Method for Producing Tactile Sensation Using Airborne Ultrasound, EuroHaptics, pp. 504-513.
Search report for PCT/GB2015/052578 dated Oct. 26, 2015.
IPRP for PCT/GB2014/051319 dated Nov. 10, 2015.
Search Report for GB1415923.0 dated Mar. 11, 2015.
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems. (pp. 2185-2188).
Obrist et al., Talking about Tactile Experiences, CHI 2013, Apr. 27-May 2, 2013.
Long et al. Rendering Volumetric Haptic Shapes in Mid-Air using Ultrasound, ACM Transactions on Graphics (Proceedings of SIGGRAPH Asia), vol. 33, No. 6, Article 181.
Freeman et al., Tactile Feedback for Above-Device Gesture Interfaces: Adding Touch to Touchless Interactions ICMI'14, Nov. 12-16, 2014, Istanbul, Turkey.
Obrist et al., Emotions Mediated Through Mid-Air Haptics, CHI 2015, Apr. 18-23, 2015, Seoul, Republic of Korea.
Wilson et al., Perception of Ultrasonic Haptic Feedback on the Hand: Localisation and Apparent Motion, CHI 2014, Apr. 26-May 1, 2014, Toronto, Ontario, Canada.
Phys.org, Touchable Hologram Becomes Reality, Aug. 6, 2009, by Lisa Zyga.
Iwamoto et al., Airborne Ultrasound Tactile Display: Supplement, The University of Tokyo 2008.
Hoshi, T., Development of Aerial-Input and Aerial-Tactile-Feedback System, IEEE World Haptics Conference 2011, p. 569-573.
EPSRC Grant summary EP/J004448/1 (2011).
Hoshi, T., Handwriting Transmission System Using Noncontact Tactile Display, IEEE Haptics Symposium 2012 pp. 399-401.
Takahashi, M. et al., Large Aperture Airborne Ultrasound Tactile Display Using Distributed Array Units, SICE Annual Conference 2010 p. 359-362.
Hoshi, T., Non-contact Tactile Sensation Synthesized by Ultrasound Transducers, Third Joint Eurohaptics Conference and Symposium on Haptic Interfaces for Virtual Environment and Teleoperator Systems 2009.
Tom Nelligan and Dan Kass, Intro to Ultrasonic Phased Array.
Light, E.D., Progress in Two Dimensional Arrays for Real Time Volumetric Imaging, 1998.
Casper et al., Realtime Control of Multiple-focus Phased Array Heating Patterns Based on Noninvasive Ultrasound Thermography, IEEE Trans Biomed Eng. Jan. 2012 ; 59(1): 95-105.
Hoshi, T., Touchable Holography, SIGGRAPH 2009, New Orleans, Louisiana, Aug. 3-7, 2009.
Sylvia Gebhardt, Ultrasonic Transducer Arrays for Particle Manipulation.
Marshall et al., Ultra-Tangibles: Creating Movable Tangible Objects on Interactive Tables, CHI'12, May 5-10, 2012, Austin, Texas.
Pompei, F.J. (2002), "Sound from Ultrasound: The Parametric Array as an Audible Sound Source", Massachusetts Institute of Technology.
Hasegawa, K. and Shinoda, H. (2013) "Aerial Display of Vibrotactile Sensation with High Spatial-Temporal Resolution using Large Aperture Airbourne Ultrasound Phased Array", University of Tokyo.
Hoshi, T. et al. (2010), "Noncontrast Tactile Display Based on Radiation Pressure of Airbourne Ultrasound", IEEE Transactions on Haptics, vol. 3, No. 3.

(56) References Cited

OTHER PUBLICATIONS

Yoshino, K. and Shinoda, H. (2013), "Visio Acoustic Screen for Contactless Touch Interface with Tactile Sensation", University of Tokyo.
Kamakura, T. and Aoki, K. (2006) "A Highly Directional Audio System using a Parametric Array in Air" WESPAC IX 2006.
Alexander, J. et al. (2011), "Adding Haptic Feedback to Mobile TV".
Carter, T. et al. (2013) "Ultrahaptics: Multi-point Mid-Air Haptic Feedback for Touch Surfaces" UIST.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Search Report for GB1308274.8 dated Nov. 11, 2013.
Search Report for PCT/GB2014/051319 dated Jul. 28, 2014.
Gavrilov L R Et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
E.S. Ebbini et al. (1991), A spherical-section ultrasound phased array applicator for deep localized hyperthermia, Biomedical Engineering, IEEE Transactions on (vol. 38 Issue: 7), pp. 634-643.
Search Report for PCT/GB2017/052332 dated Oct. 10, 2017.

\* cited by examiner

METHOD AND APPARATUS FOR PRODUCING AN ACOUSTIC FIELD

REFERENCE TO RELATED APPLICATIONS

The present application is a U.S. national phase of PCT Application No. PCT/GB2014/051319(published as WO 2014/181084), filed Apr. 29, 2014, which claims benefit of United Kingdom Application No. 1308274.8, filed May 8, 2013. All of the above-referenced applications are incorporated herein by reference.

BACKGROUND

It is known to use a continuous distribution of sound energy, which will be referred to herein as an "acoustic field", for a range of applications, including haptic feedback.

It is known to control an acoustic field by defining one or more control points in a space within which the acoustic field may exist. Each control point is assigned an amplitude value equating to a desired amplitude of the acoustic field at the control point. Transducers are then controlled to create an acoustic field exhibiting the desired amplitude at each of the control points.

However, known systems for producing an acoustic field using control points suffer from limitations when a large number of control points are used.

SUMMARY OF INVENTION

According to a first aspect of the present invention there is provided a method of producing an acoustic field using an array of transducers having known relative positions and orientations, the method comprising:
  defining a plurality of control points which each have a known spatial relationship relative to the array of transducers;
  assigning an amplitude to each control point;
  computing a matrix containing elements which represent, for each of the control points, the effect that producing a modeled acoustic field having the assigned amplitude with a particular phase at the control point has on the consequential amplitude and phase of the modeled acoustic field at the other control points;
  determining eigenvectors of the matrix, each eigenvector representing a set of phases and relative amplitudes of the modeled acoustic field at the control points;
  selecting one of the sets and operating the transducer array to cause one or more of the transducers to output an acoustic wave each having an initial amplitude and phase such that the phases and amplitudes of the resultant acoustic field at the control points correspond to the phases and relative amplitudes of the selected set.

Thus, the first aspect of the invention includes formulating an eigenproblem which can be solved to find valid phases at the control points. The inventors have found that use of an eigenproblem in the embodiments of the invention results in a faster and more predictable solution time in comparison with known methods, which in turn means that a higher number of control points can be supported, and may enable real-time updating of the control points. A faster and more predictable solution time also means that an acoustic field of larger volume can be controlled in comparison to known methods.

A control point is a marker at a particular location. The distance between adjacent control points should be sufficient to enable the sound waves of the acoustic field to phase shift from one of the control points to match the next control point. In some embodiments the separation distance may be equal to the wavelength of the sound waves of the acoustic field.

In embodiments of the invention a transducer array comprises one or more transducers in any suitable configuration; for example, one or more two dimensional arrays arranged in parallel.

The modelled acoustic field which has the assigned amplitude and a particular phase at a control point may be modelled as being produced by a virtual transducer directly below the control point. In some embodiments the virtual transducer may be in the in the plane of the real transducer array. However, the skilled person will appreciate the acoustic field may be modelled as being produced by other arrangements of virtual transducers, that is one or more virtual transducers which may be positioned directly below the control point or may have a different spatial relationship to the control point may be used to produce the modelled acoustic field. The use of virtual transducers enables a lookup table to be pre-computed. Preferably, the virtual transducers match the transducers of the transducer array.

The method may include the step of calculating eigenvalues of the matrix. The eigenvalues represent scaling factors, some of which will be relatively high and some of which will be relatively low, in relation to each other. The method may comprise selecting a set of phases and relative amplitudes with a relatively high corresponding eigenvalue as the selected set. Preferably, the method may comprise selecting the set of phases and relative amplitudes with the highest corresponding eigenvalue as the selected set.

The eigenvalues define how the corresponding eigenvectors scale when they are transformed by the matrix. That is, the eigenvalues represent how much the relative amplitudes of the acoustic field at the control points will scale up once the indirect contributions to the amplitude at each control point caused by producing an assigned amplitude at the other control points is taken into account. Therefore, finding a large eigenvalue indicates a corresponding set of relative amplitudes and phases that make use of a large amount of constructive interference. Choosing a set of relative amplitudes and phases with a corresponding eigenvalue which is relatively high, taking into account the relative values of all the eigenvalues of the matrix, therefore has an advantage over choosing a relatively low eigenvalue, as it makes more efficient use of the power output by the transducers.

The method may include computing the effect of producing the assigned amplitude at one of the control points on the amplitude and phases at each of the other control points using a look-up function which defines how the amplitude and phase of the acoustic waves varies spatially due to attenuation and propagation. The look-up function may take into account one or both of two sources of amplitude and phase variation. Firstly, attenuation of the amplitude of acoustic waves output by a transducer, which increases with distance from the transducer, and secondly, the changes in phase that occur as the acoustic waves propagate through space.

If such a look-up function is used, the spatial variation of the phase of the sound waves due to attenuation and propagation only needs to be computed once for a particular transducer array, which decreases the time needed to model the acoustic field and the time needed to calculate the initial amplitude and phases of the transducers that will produce the phases and amplitudes of the resultant acoustic field.

The method may include a regularisation step in which errors are introduced into the initial amplitude and phase output by the transducers.

The advantage of including a regularisation step is that this can improve the power output efficiency of the array by increasing the average amplitude of the transducers so that more of them are on at a higher amplitude. For example, to avoid a situation where one transducer is on at 100% and all of the others are on at 0.1%, the regularisation step introduces some errors in return for the average amplitude of the transducers being raised to, say, 80%.

The regularisation technique may be a weighted Tikhonov regularisation. The advantage of using a weighted Tikhonov regularisation is that it has an easily specified matrix augmentation.

The power output by the transducer array may be scaled such that the transducer outputting the highest of the initial amplitudes operates at substantially full power. Scaling the power output in this way has an advantage in that it results in the power output of the transducer array being as high as possible for a given set of initial amplitudes, whilst maintaining the levels of the initial amplitudes, relative to each other. The transducers may be ultrasound transducers.

Using ultrasound transducers gives rise to an advantage in the areas of, for example, haptic feedback, where the transducer array may be operated such that a user feels an acoustic radiation force produced by the acoustic field, or in manufacturing, for example for drying glue on products on a production line.

The acoustic waves may be modulated at a frequency between 0 Hz and half of the carrier frequency; in some embodiments the carrier frequency is 40 kHz. In some embodiments the acoustic waves may be modulated at a frequency between 0.1 Hz to 500 Hz, and in some cases between 200 Hz and 300 Hz.

Modulating the acoustic waves at a frequency between 0.1 Hz to 500 Hz gives rise to an advantage of increasing the suitability of the method for use in haptic feedback applications, since tactile receptors in skin are most sensitive to changes in skin deformation at these frequencies.

The positions of the control points may be chosen to define parts of a virtual three-dimensional shape which occupies a volume in the acoustic field. For example, the control points may lie on the edges of the shape or adjacent to the edges of the shape or within the volume of the shape. The control points may define the whole of the shape, or more preferably a part of the shape. For example the control points may define a shape to be felt by a user as part of a haptic feedback system of which only the part of the shape with which the user is interacting may need to be defined, or the shape may be the shape of a product having points of interest on which an acoustic radiation force may be focussed for manufacturing applications such as drying glue.

The control points may be divided into a first group of control points at which the acoustic field has a relatively high amplitude and a second group of control points at which the acoustic field has a relatively low amplitude in comparison to the high amplitude. The edges of the virtual shape may be defined by the first group of control points. The control points in the second group may be adjacent to the first group of control points, such that a gradient in amplitude of the acoustic field is produced at the edge of the virtual shape. In some embodiments a control point of the first group may be spaced from an adjacent control point from the second group by at least half a wavelength of the sound waves of the acoustic field.

Providing a group of control points at which the acoustic field has a relatively high amplitude and a group of control points at which the acoustic field has a relatively low amplitude to provide a gradient in amplitude of the acoustic field at the edge of a virtual shape provides an advantage in haptic feedback applications since it produces a more detectable difference in amplitude of the acoustic field, rendering the edge of the virtual shape more easily detectable by a user. Also, in the case of haptic feedback, the relatively low amplitude control points can ensure that the parts of a user's hand that are not in contact with the shape cannot feel residual ultrasound surrounding the shape. In the absence of the low amplitude control points, the ultrasound at those points is not controlled and so there may be some constructive areas that the hand can feel.

At least some of the control points may be positioned at points where an object intersects with the virtual shape. At least some of the control points may be positioned adjacent to the points of intersection.

Positioning the control points at points in the region of where an object, for example a user's hand, intersects the virtual shape provides the advantage that the acoustic field only needs to be controlled at points on the virtual shape with which the object is interacting, which enables higher amplitudes to be produced at those control points. The points where the object intersects with the virtual shape may be monitored in real time by an object tracker, and control points may be positioned at different points in the acoustic field in response to the object position.

In some embodiments a low amplitude control point may be supported by high amplitude control points to define a pocket that can hold an object at the low amplitude control point.

The number of control points may be at least 10 and preferably at least 50. The upper limit on the number of control points may be governed by how large matrices linear algebra algorithms can process.

A higher number of control points enables the produced acoustic field to have more points at which the amplitude can be controlled. This feature enables, for example, more complicated 3-dimensional or 2-dimensional virtual shapes to be defined, or where only part of a virtual shape is being defined, more detail may be represented on that part of the shape.

The method may comprise a method for producing haptic feedback, a method for levitation of small, objects, a method for manufacturing, or a method for non-destructive testing.

According to a second aspect of the invention, there is provided an apparatus for producing an acoustic field, the apparatus comprising an array of transducers having known relative positions and orientations, and a data processor, the data processor configured to:

compute a matrix containing elements which represent for each of a plurality of control points, which each have a known spatial relationship relative to the array of transducers and each have an amplitude assigned to them, the effect that producing a modeled acoustic field having the assigned amplitude with a particular phase at the control point has on the consequential amplitude and phase of the modeled acoustic field at the other control points;

determine eigenvectors of the matrix, each eigenvector representing a set of phases and relative amplitudes of the modeled acoustic field at the control points, such that one of the sets may be selected and the transducer array may be operated to cause one or more of the transducers to output an acoustic wave each having an initial amplitude and phase such that the phases and amplitudes of the resultant acoustic field at the control points correspond to the phases and relative amplitudes of the selected control set.

Thus, the apparatus according to the second aspect is configured to formulate an eigenproblem which can be solved to find valid phases at the control points. The inventors have found that use of an eigenproblem in the embodiments of the invention results in a faster and more predictable solution time in comparison with known apparatuses, which in turn means that a higher number of control points can be supported, and may enable real-time updating of a large number of control points. A less powerful data processor may be required than if the data processor was configured to perform, say, an iterative method to find valid phases at the control points. A faster and more predictable solution time also means that an acoustic field of larger volume can be controlled in comparison to known methods.

The apparatus may be arranged to determine eigenvalues of the matrix, the eigenvalues representing scaling factors, some of which will be relatively high and some of which will be relatively low, wherein a set of phases and relative amplitudes with a relatively high corresponding eigenvalue is selected as the selected set.

The eigenvalues define how the corresponding eigenvectors scale when they are transformed by the matrix. That is, the eigenvalues represent how much the relative amplitudes of the acoustic field at the control points will scale up once the indirect contributions to the amplitude at each control point caused by producing an assigned amplitude at the other control points is taken into account. Therefore, finding a large eigenvalue indicates a corresponding set of relative amplitudes and phases that make use of a large amount of constructive interference. An apparatus arranged to choose a set of relative amplitudes and phases with a corresponding eigenvalue which is relatively high, taking into account the relative values of all the eigenvalues of the matrix, therefore has an advantage over an apparatus that may choose a relatively low eigenvalue, as it makes more efficient use of the power output by the transducers.

The data processor may be arranged to perform a regularisation step in which errors are introduced into the initial amplitude and phase output by the transducers.

The advantage of performing a regularisation step is that this can improve the power output efficiency of the array by increasing the average amplitude of the transducers so that more of them are on at a higher amplitude. For example, to avoid a situation where one transducer is on at 100% and all of the others are on at 0.1%, the regularisation step introduces some errors in return for the average amplitude of the transducers being raised to, say, 80%.

The regularisation step may be a weighted Tikhonov regularisation. The advantage of using a weighted Tikhonov regularisation is that it has an easily specified matrix augmentation.

The apparatus may be arranged to modulate the acoustic waves at a frequency between 0 Hz and half of the carrier frequency; in some embodiments the carrier frequency is 40 kHz. In some embodiments the acoustic waves may be modulated at a frequency between 0.1 Hz to 500 Hz, and in some cases between 200 Hz and 300 Hz.

Modulating the acoustic waves at a frequency between 0.1 Hz to 500 Hz gives rise to an advantage of increasing the suitability of the apparatus for use in haptic feedback applications, since tactile receptors in skin are most sensitive to changes in skin deformation at these frequencies.

The apparatus may comprise an object tracker and may be configured to define control points based on where the object intersects a modelled shape.

The use of an object tracker, such as a hand tracker, provides an advantage of enabling positions of control points to be updated in real time in response to the position of, say, a user's hand which may be moving.

According to a third aspect of the invention, there is provided a data processor configured to perform the method of the first aspect of the invention.

The data processor according to the third aspect may result in a faster and more predictable solution time, which in turn means that a higher number of control points can be supported, and may enable real-time updating of the control points by the data processor. In addition a less powerful data processor may be needed to perform the method of the first aspect of the invention than if the data processor was configured to perform an iterative method. A faster and more predictable solution time also means that an acoustic field of larger volume can be controlled in comparison to known methods

BRIEF DESCRIPTION OF THE DRAWINGS

Embodiments of the invention will now be described, by way of example only, with reference to the accompanying drawings, of which.

DESCRIPTION OF EMBODIMENTS

Figure 1:
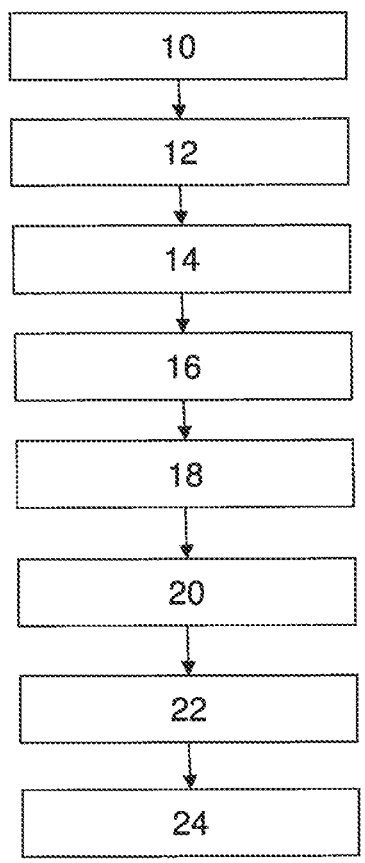
FIG. 1 is a flow chart schematically representing a method according to an embodiment of the invention.

FIG. 1 shows a flow chart schematically representing a method of producing an acoustic field according to a first embodiment of the invention.

The method begins at step 10, in which in which a plurality of control points are defined. A control point is a point positioned in a space through which the acoustic field may propagate, at which the amplitude or phase of the acoustic field is to be controlled A control point is a marker at a particular location. The distance between adjacent control points should be sufficient to enable the sound waves of the acoustic field to phase shift from one of the control points to match the next control point. In some embodiments the separation distance may be equal to the wavelength of the sound waves of the acoustic field, for example a separation of 8.5 mm for a 40 kHz carrier wave. In some embodiments, the separation distance may be equal to half the wavelength of the sound waves of the acoustic field. In some embodiments the separation may be greater than the wavelength of the sound waves of the acoustic field. The skilled person will appreciate that other suitable separation distances could be used.

An array of transducers is arranged to produce the acoustic field. In embodiments of the invention a transducer array comprises one or more transducers in any suitable configuration; for example, one or more two dimensional arrays arranged in parallel.

The positions of the control points relative to the array of transducers is determined. The use of control points to control an acoustic field is known from a paper entitled "The possibility of generating focal regions of complex configurations in application to the problems of stimulation of human receptor structures by focused ultrasound", L. R. Gavrilov, 2008, Acoustical Physics Volume 54, Issue 2, pp 269-278, Print ISSN 1063-7710.

In the first embodiment, the acoustic field is produced in air. However, in some embodiments the acoustic field may be produced in another medium through which sound waves can pass, such as water.

At step 12 amplitudes are assigned to the control points. The assigned amplitudes represent target amplitudes of the acoustic field at the control points, which form a basis for modelling the acoustic field. The control points are assigned by a user; however, in other embodiments, the control points may be assigned by an automated process.

At step 14, an acoustic field is modelled for each control point. According to the first embodiment, modelling the acoustic field at a control point comprises modelling the acoustic field produced by a virtual transducer directly below the control point in the plane of the real transducer array, the initial amplitude and phase of the virtual transducer being modelled such that the modelled acoustic field has the assigned amplitude at the control point. However, in some embodiments, alternative ways of modelling the acoustic field may be used, for example, different arrangements of virtual transducers may be used, that is one or more virtual transducers may be positioned directly below the control point or may have a different spatial relationship to the control point may be used to produce the modelled acoustic field. In the first embodiment, step 14 comprises modelling the acoustic field separately for each control point.

At step 16, a matrix is computed which contains elements which represent, for each of the control points, the effect that producing the modeled acoustic field of step 14 having the assigned amplitude of step 12 with a particular phase at the control point has on the consequential amplitude and phase of the modeled acoustic field at the other control points. In the first embodiment, the matrix computed at step 16 is an N×N matrix where N equals the number of control points although other suitable forms of matrix will be apparent.

At step 18, eigenvectors of the matrix are determined. In the first embodiment step 18 comprises determining right eigenvectors of the matrix, each eigenvector representing a set of phases and relative amplitudes of the modeled acoustic field at the control points.

At step 20, a set of relative phases and amplitudes is selected by selecting one of the eigenvectors determined in step 18.

At step 22, initial phases and amplitudes to be output by the individual transducers of the array of transducers are calculated. The initial phases and amplitudes are calculated such that they produce a resultant acoustic field with phases and amplitudes that correspond to the phases and relative amplitudes of the selected set. In embodiments of the invention the term "correspond" may be used to mean that the phases and amplitudes of the resultant acoustic field at the control points will be substantially equal to the phases and relative amplitudes of the selected set, taking into account any errors that may be introduced as part of a regularisation step. Thus, the algorithm according to embodiments of the invention may compute the phase delay and amplitude for the transducers in the array that will create an acoustic field that best matches the assigned amplitudes of the control points.

At step 24, the transducers of the transducer array are operated such that the transducer array outputs acoustic waves having the initial amplitudes and phases which were calculated in step 22.

In some embodiments, the transducers may be operated to continue to output one or more acoustic waves. In some embodiments, the control points may be re-defined and the method may repeat with a different set of control points.

In some embodiments, the method may include the step of calculating eigenvalues of the matrix. The eigenvalues represent scaling factors, some of which will be relatively high and some of which will be relatively low, in relation to each other. In some embodiments, the method may comprise selecting a set of phases and relative amplitudes with a relatively high corresponding eigenvalue as the selected set. In some embodiments, the method may comprise selecting the set of phases and relative amplitudes with the highest corresponding eigenvalue as the selected set.

The eigenvalues define how the corresponding eigenvectors scale when they are transformed by the matrix. That is, the eigenvalues represent how much the relative amplitudes of the acoustic field at the control points will scale up once the indirect contributions to the amplitude at each control point caused by producing an assigned amplitude at the other control points is taken into account. Therefore, finding a large eigenvalue indicates a corresponding set of relative amplitudes and phases that make use of a large amount of constructive interference.

Choosing a set of relative amplitudes and phases with a corresponding eigenvalue which is relatively high, taking into account the relative values of all the eigenvalues of the matrix, has an advantage over choosing a relatively low eigenvalue, as it makes more efficient use of the power output by the transducers.

In some embodiments, the method may include computing the effect of producing the assigned amplitude at one of the control points on the amplitude and phases at each of the other control points using a look-up function which defines how the amplitude and phase of the acoustic waves varies spatially due to attenuation and propagation.

In some embodiments in which a look-up function is used, the spatial variation of the phase of the sound waves due to attenuation and propagation is computed once for a particular transducer array, which decreases the time needed to model the acoustic field and the time needed to calculate the initial amplitude and phases of the transducers that will produce the phases and amplitudes of the resultant acoustic field.

In some embodiments, the method may include a regularisation step in which errors are introduced into the initial amplitude and phase output by the transducers.

The advantage of including a regularisation step is that this can improve the power output efficiency of the array by increasing the average amplitude of the transducers so that more of them are on at a higher amplitude. For example, to avoid a situation where one transducer is on at 100% and all of the others are on at 0.1%, the regularisation step introduces some errors in return for the average amplitude of the transducers being raised to, say, 80%.

In some embodiments, the regularisation technique may be a weighted Tikhonov regularisation. The advantage of using a weighted Tikhonov regularisation is that it has an easily specified matrix augmentation.

In some embodiments, the power output by the transducer array may be scaled such that the transducer outputting the highest of the initial amplitudes operates at substantially full power. Scaling the power output in this way has an advantage in that it results in the power output of the transducer array being as high as possible for a given set of initial amplitudes, whilst maintaining the levels of the initial amplitudes, relative to each other.

In some embodiments, the transducers may be ultrasound transducers.

Using ultrasound transducers gives rise to an advantage in the areas of, for example, haptic feedback, where the transducer array may be operated such that a user feels an acoustic radiation force produced by the acoustic field, or in manufacturing, for example for drying glue on products on a production line.

In some embodiments, the acoustic waves may be modulated at a frequency between 0 Hz and half of the carrier frequency; in some embodiments the carrier frequency is 40 kHz. In some embodiments the acoustic waves may be modulated at a frequency between 0.1 Hz to 500 Hz, and in some cases between 200 Hz and 300 Hz.

Modulating the acoustic waves at a frequency between 0.1 Hz to 500 Hz gives rise to an advantage of increasing the suitability of the method for use in haptic feedback applications, since tactile receptors in skin are most sensitive to changes in skin deformation at these frequencies.

In some embodiments, the positions of the control points may be chosen to define parts of a virtual three-dimensional shape which occupies a volume in the acoustic field. In some embodiments, the control points may lie on the edges of the shape or adjacent to the edges of the shape. In some embodiments, the control points may lie within the volume of the shape. In some embodiments, the control points may define the whole of the shape. In some embodiments the control points may define part of the shape. In some embodiments, the control points may define a shape to be felt by a user as part of a haptic feedback system of which only the part of the shape with which the user is interacting may need to be defined. In some embodiments, the shape may be the shape of a product having points of interest on which an acoustic radiation force may be focussed for manufacturing applications such as drying glue.

In some embodiments, the control points may be divided into a first group of control points at which the acoustic field has a relatively high amplitude and a second group of control points at which the acoustic field has a relatively low amplitude in comparison to the high amplitude. The control points amplitude may be between the maximum and minimum. For example, some control points could be at half amplitude. Some applications may have a wide distribution of amplitudes throughout the control points; for example, in order to vary the intensity of haptic feedback across a region.

In some embodiments, the edges of the virtual shape may defined by the first group of control points. The control points in the second group may each be arranged so as to be adjacent to a control point of the first group, such that a gradient in amplitude of the acoustic field is produced at the edge of the virtual shape.

Providing a group of control points at which the acoustic field has a relatively high amplitude and a group of control points at which the acoustic field has a relatively low amplitude to provide a gradient in amplitude of the acoustic field at the edge of a virtual shape provides an advantage in haptic feedback applications since it produces a more detectable difference in amplitude of the acoustic field, rendering the edge of the virtual shape more easily detectable by a user.

At least some of the control points may be positioned at points where an object intersects with the virtual shape. At least some of the control points may be positioned adjacent to the points of intersection.

Positioning control points in the region of points where an object such as a user's hand intersects the virtual shape provides the advantage that the acoustic field only needs to be controlled at points on the virtual shape with which the object is interacting, which enables higher amplitudes to be produced at those control points. The points where the object intersects with the virtual shape may be monitored in real time by an object tracker, and control points may be positioned at different points in the acoustic field in response to the object position.

In some embodiments, the number of control points may be at least 10 and preferably at least 50.

A higher number of control points enables the produced acoustic field to have more points at which the amplitude can be controlled. This feature enables, for example, larger or more complicated 3-dimensional or 2-dimensional virtual shapes to be defined, or where only part of a virtual shape is being defined, more detail may be represented on that part of the shape.

Figure 2:
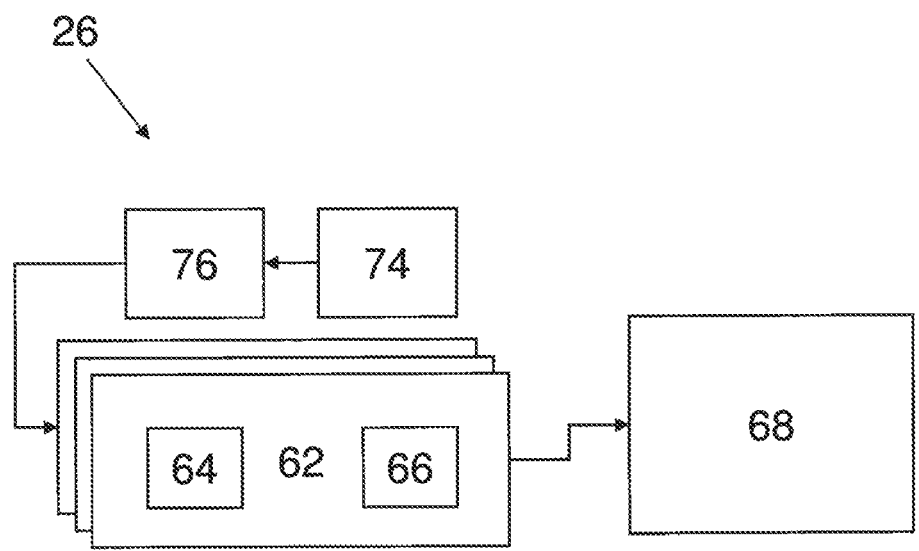
FIG. 2 is a schematic representation showing an apparatus according to an embodiment of the invention.

FIG. 2 shows an apparatus 26 according to an embodiment of the invention for producing an acoustic field.

The apparatus 26 comprises an array of transducers 68 having known relative positions and orientations. The array 68 may be a 2D planar array, may be a regular array or any other suitable set of transducers having any suitable arrangement, and may comprise any suitable number of transducers, such as a 16×16 array. It is preferred that the array comprises at least four transducers. Any suitable type of acoustic transducers may be used; for example, muRata MA40S4S ultrasound transducers. muRata MA40S4S transducers provide an advantage in that they produce a relatively large amount of sound pressure (20 Pascals at a distance of 30 cm) and have a relatively wide angle of directivity (60 degrees).

In the embodiment shown in FIG. 2, the acoustic waves output by the transducers have a frequency of 40 kHz. The advantage of using acoustic waves of this frequency is that acoustic waves of this frequency maintain 90% of their energy at a distance of 400 mm from a radiation surface in air. A further advantage is that piezoelectric transducers that emit acoustic waves which have a frequency of 40 kHz are commercially available due to their use in car parking sensors. However, acoustic waves of any suitable frequency may be used. In the embodiment shown in FIG. 2, all of the acoustic waves used to produce the acoustic field are of the same frequency. However, in some embodiments the acoustic field may be produced using acoustic waves of two or more different frequencies.

The transducers 68 are driven by driver boards 62, which each include processors 64 and amplifiers 66. Any suitable type of processors may be used; for example XMOS L1-128 processors running at 400 MHz. The data processors 64 have synchronised clocks and produce a signal to be sent to each transducer, that will cause the transducers to output acoustic waves having the initial amplitudes and phases required to produce the acoustic field. In the embodiment shown in FIG. 2, the data processors output one square wave for each transducer. The amplifiers 66 amplify the signals output by the data processor to a level suitable for driving the transducers. In the embodiment shown in FIG. 2, the square wave signals are amplified from 5V peak to peak to 15V by the amplifiers 66.

In the embodiment shown in FIG. 2, the apparatus further comprises a PC 74, which includes a data processor. The data processor is configured to compute a matrix containing elements which represent for each of a plurality of control points, which each have a known spatial relationship relative to the array of transducers and each have an amplitude assigned to them, the effect that producing a modeled acoustic field having the assigned amplitude with a particular phase at the control point has on the consequential amplitude and phase of the modeled acoustic field at the other control points. The data processor is also configured to determine eigenvectors of the matrix, each eigenvector representing a set of phases and relative amplitudes of the modeled acoustic field at the control points. In some embodiments the data processor may comprise one or more discrete data processors. Any suitable type of data processors may be used with embodiments of the invention, such as microcontrollers or ASICs.

In some embodiments, the control points may be defined by a user. In some embodiments the control points may be defined automatically, in response to data collected by another piece of apparatus such as a hand tracker. In some embodiments, the amplitudes of the control points may be assigned by a user. In some embodiments, the amplitudes of the control points may be assigned by an automated process.

In some embodiments, the data processor configured to compute the matrix may be part of the PC 74. In some embodiments, the data processor configured to compute the matrix may be a stand alone unit which may be further configured to select one of the sets of phases and relative amplitudes and operate the transducer array to cause one or more of the transducers to output an acoustic wave each having an initial amplitude and phase such that the phases and amplitudes of the resultant acoustic field at the control points correspond to the phases and relative amplitudes of the selected set.

In the embodiment shown in FIG. 2, data processed by the PC 74 is sent to the driver boards 62 via an Ethernet controller 76. The Ethernet controller comprising an Ethernet interface and a processor. The Ethernet controller 76 sorts the received data and forwards it to the processors 64 of the driver boards 62. However, other protocols such as Thunderbolt, USB, Firewire etc. may be used.

In some embodiments, the data processor may be arranged to determine eigenvalues of the matrix, the eigenvalues representing scaling factors, some of which will be relatively high and some of which will be relatively low, wherein a set of phases and relative amplitudes with a relatively high corresponding eigenvalue is selected as the selected set. In some embodiments, the apparatus may be arranged to select the eigenvector with the highest corresponding eigenvalue.

The eigenvalues define how the corresponding eigenvectors scale when they are transformed by the matrix. That is, the eigenvalues represent how much the relative amplitudes of the acoustic field at the control points will scale up once the indirect contributions to the amplitude at each control point caused by producing an assigned amplitude at the other control points is taken into account. Therefore, finding a large eigenvalue indicates a corresponding set of relative amplitudes and phases that make use of a large amount of constructive interference. An apparatus arranged to choose a set of relative amplitudes and phases with a corresponding eigenvalue which is relatively high, taking into account the relative values of all the eigenvalues of the matrix, therefore has an advantage over an apparatus that may choose a relatively low eigenvalue, as it makes more efficient use of the power output by the transducers.

Any suitable method of calculating the eigenvectors and eigenvalues of the matrix may be used; for example the CGEEV routine of the MAGMA GPU linear algebra library may be used. Any suitable method of calculating the initial amplitudes and phases that will produce the acoustic field may be used; for example the CGELS LAPACK routine of the MAGMA GPU linear algebra library may be used.

In some embodiments, the apparatus may be arranged to perform a regularisation step in which errors are introduced into the initial amplitude and phase output by the transducers.

The advantage of performing a regularisation step is that this can improve the power output efficiency of the array by increasing the average amplitude of the transducers so that more of them are on at a higher amplitude. For example, to avoid a situation where one transducer is on at 100% and all of the others are on at 0.1%, the regularisation step introduces some errors in return for the average amplitude of the transducers being raised to, say, 80%. In the embodiment shown in FIG. 2 the regularisation step is performed by the PC 74.

In some embodiments, the regularisation step may be a weighted Tikhonov regularisation. The advantage of using a weighted Tikhonov regularisation is that it has an easily specified matrix augmentation.

In some embodiments, the apparatus may be arranged to modulate the acoustic waves at a frequency between 0 Hz and half of the carrier frequency; in some embodiments the carrier frequency is 40 kHz. In some embodiments the acoustic waves may be modulated at a frequency between 0.1 Hz to 500 Hz, and in some cases between 200 Hz and 300 Hz.

Modulating the acoustic waves at a frequency between 0.1 Hz to 500 Hz gives rise to an advantage of increasing the suitability of the apparatus for use in haptic feedback applications, since tactile receptors in skin are most sensitive to changes in skin deformation at these frequencies.

The apparatus may comprise an object tracker and may be configured to define control points based on where the object intersects a modelled shape.

Figure 3:
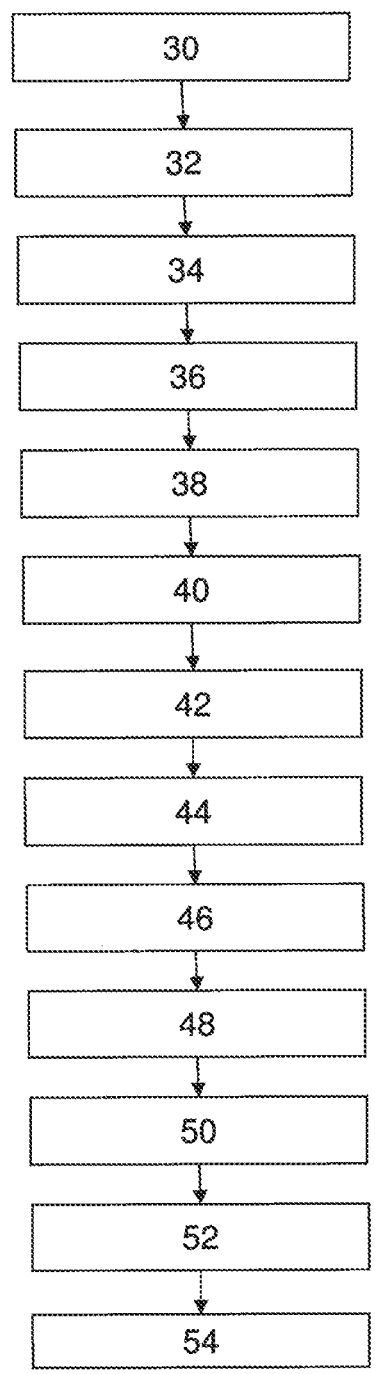
FIG. 3 is a flow chart schematically representing a method according to a further embodiment of the invention.

FIG. 3 shows a flow chart which schematically represents the method according to an embodiment of the invention, in which the method is for a haptic feedback application.

At step 30 a look-up function is calculated, which defines how the amplitude and phase of the acoustic waves vary spatially due to attenuation and propagation. The look-up function of the embodiment of the invention shown in FIG. 3 takes into account two sources of amplitude and phase variation. Firstly, attenuation of the amplitude of acoustic waves output by a transducer, which increases with distance from the transducer, and secondly, the changes in phase that occur as the acoustic waves propagate through space.

At step 32, a three-dimensional virtual shape is defined in the volume to be occupied by the acoustic field. The three-dimensional shape may be defined by a user or defined by an automated process.

At step 34, the position of a hand within the volume to be occupied by the acoustic field is tracked. The hand tracking may be performed by a known hand tracker such as a Leap Motion® Controller produced by Leap Motion Inc, which has a range of 100 cm and a field of view of 140 degrees. In the embodiment shown in FIG. 3, tracking data is captured at 60 fps, although in some embodiments, tracking data may be captured at other speeds. Step 34 additionally comprises determining the positions of any points at which the hand is intersecting the virtual shape.

At step 36, control points are defined. In the embodiment shown in FIG. 3, the positions of the control points are chosen such that they define at least one part of the three-dimensional virtual shape; for example, the control points may lie or on or adjacent to the edges of the virtual three-dimensional shape. The control points are defined at parts of the virtual three-dimensional shape which are intersected by a hand.

In some embodiments, step 32 may be omitted and the control points may be defined in response to measurements of a user's hand. In embodiments in which step 32 is omitted, the control points may be positioned on the fingertips or palm of a users hand, for example, in applications such as projecting Braille onto a user's hand In the embodiment shown in FIG. 3, the control points are divided into two groups. The first group of control points are positioned on an edge of the virtual three dimensional shape and the second group of control points are positioned adjacent to the control points of the first group, outside of the volume occupied by the three dimensional shape; for example, by creating a bounding box around the hand and then slightly enlarging it to include nearby control points. In the embodiment shown in FIG. 3, the three-dimensional shape is defined by control points positioned at an edge of the shape, however in some embodiments, the three dimensional shape may be defined by additionally or alternatively having control points positioned within the volume of the shape.

At step 38 amplitudes are assigned to the control points. The first group of control points are assigned relatively high amplitudes and the second group of control points are assigned relatively low amplitudes, in order to create a gradient at the edge of the three-dimensional virtual shape.

At step 40 an acoustic field is modelled for each control point. Modelling the acoustic field at a control point comprises modelling the acoustic field produced by a virtual transducer directly below the control point in the plane of the real transducer array, the initial amplitude and phase of the virtual transducer being modelled such that the modelled acoustic field has the assigned amplitude at the control point. This calculation is done using the look-up function that was calculated in step 30. Step 40 comprises modelling the acoustic field in this way separately for each control point.

At step 42, a matrix is computed containing elements which represent, for each of the control points, the effect that producing the modeled acoustic field of step 40 having the assigned amplitude of step 38 with a particular phase at the control point has on the consequential amplitude and phase of the modeled acoustic field at the other control points. In the embodiment shown in FIG. 3, the matrix computed at step 42 is an N×N matrix where N equals the number of control points, although other suitable forms of matrix will be apparent.

At step 44, eigenvectors of the matrix are determined. In the embodiment shown in FIG. 3 step 44 comprises determining right eigenvectors of the matrix, each eigenvector representing a set of phases and relative amplitudes of the modeled acoustic field at the control points.

The embodiment shown in FIG. 3 additionally includes step 46, which comprises determining eigenvalues of the matrix. In some embodiments, determining eigenvectors and eigenvalues of the matrix may comprise a single step in the method.

At step 48 a set of relative phases and amplitudes is selected. In the embodiment shown in FIG. 3 the set of relative phases and amplitudes is selected by selecting an eigenvector with a corresponding eigenvalue which is relatively high, taking into account the relative values of all the eigenvalues of the matrix. Preferably, the eigenvector with the highest corresponding eigenvalue is selected.

At step 50, the initial phases and amplitudes to be output by the individual transducers of the array of transducers are calculated, such that the phases and amplitudes of the resultant acoustic field at the control points correspond to the phases and relative amplitudes of the selected set. In the embodiment shown in FIG. 3, the calculation of step 50 is performed using the look-up table previously calculated in step 30. In the embodiment shown in FIG. 3, the array of transducers comprises 64 transducers that are positioned in a single plane. However in alternative embodiments, different numbers and arrangements of transducers could be used to form the transducer array.

At step 52, a regularisation step is performed in order to ensure that the acoustic waves output by the transducers do not exceed the power limitations of the transducers. The regularisation step is a weighted Tikhonov regularisation in which errors are introduced into the initial amplitude and phase output by the transducers, such that the transducers do not exceed the power limitations of the array, and the total power availability of the array is used more efficiently than if the method was performed without a regularisation step.

At step 52, gain is also introduced to normalise the power output of the array, causing the transducer with the highest calculated initial amplitude to operate at substantially full power, and scaling up the power output by the other transducers of the array such that the relative values of the amplitudes are not changed by introducing gain. The values of the relative amplitudes may be slightly changed during step 52 due to the errors introduced during the regularisation step. Therefore the initial amplitudes and phases that are used in step 54 are the adjusted values of the initial amplitudes and phases of step 50, taking into account any adjustment to the values of the initial amplitudes and phases provided during step 52.

At step 54 the transducers of the transducer array are operated such that the transducer array outputs one or more acoustic waves having the adjusted initial amplitudes and phases that were calculated in step 52. In the embodiment shown in FIG. 3, the transducer array is an ultrasound transducer array, and outputs acoustic waves that are modulated at a frequency between 200 Hz and 300 Hz.

Figure 4:
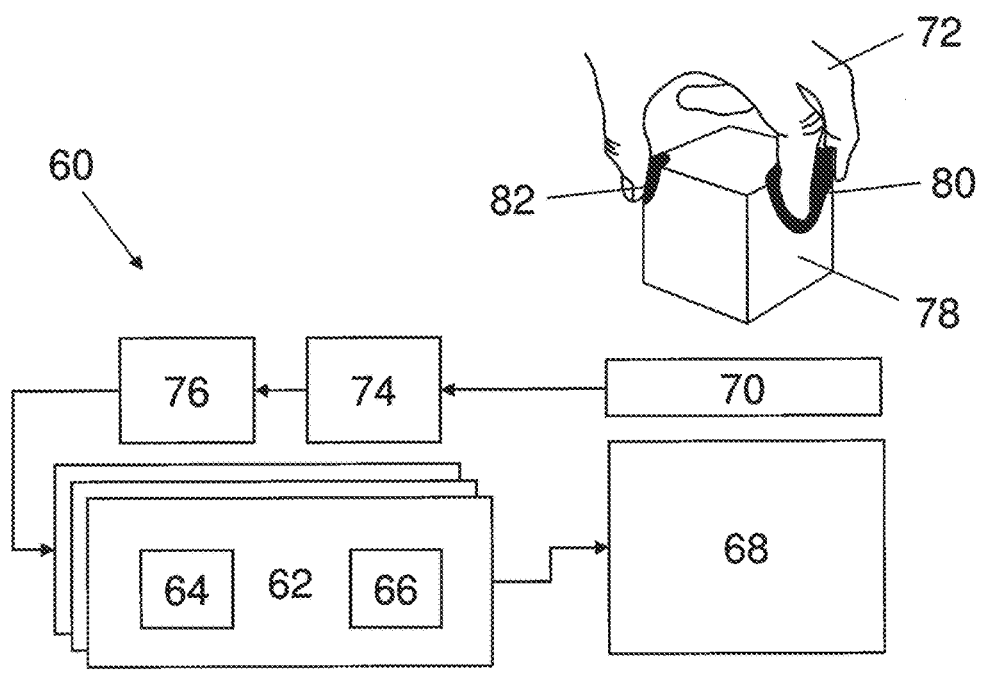
FIG. 4 is a schematic representation showing an apparatus according to a further embodiment of the invention.

FIG. 4 illustrates an apparatus 60 arranged to perform the method described with reference to FIG. 3. Parts of the apparatus which are equivalent to parts of the apparatus shown in FIG. 2 are numbered with like reference numerals.

The apparatus 60 comprises an array of transducers 68, driver boards 62 which comprise data processors 64 and amplifiers 66, a PC 75 and an Ethernet controller 76.

The apparatus further comprises a hand tracker 70. The hand tracker 70 may be, for example a Leap Motion® Controller. The hand tracker 70 is configured to detect the position of a user's hand 72 in the acoustic field.

In the embodiment shown in FIG. 4, the PC 74 is configured to receive data measured by the hand tracker, process the hand tracker data, and to send the processed data to the driver boards 62 via an Ethernet controller 76.

A three-dimensional virtual shape 78 is defined in a space in which the acoustic field may be produced. The hand tracker 70 is configured to detect when the hand 72 interacts with the virtual shape 78. The transducer array 68 is then operated to produce an acoustic field having relatively high amplitude at points of intersection 80, 82 between the hand 72 and the virtual shape 78 according to the method of the embodiment shown in FIG. 3.

In the embodiment shown in FIG. 4, the transducer array 68 is an ultrasound transducer array and the individual transducers are configured to output ultrasound waves that are modulated at a frequency between 200 Hz and 300 Hz.

The use of an object tracker, such as a hand tracker, provides an advantage of enabling positions of control points to be updated in real time in response to the position of, say, a user's hand which may be moving.

Embodiments of the invention may result in a faster and more predictable control point solution time in comparison with known methods, which in turn means that a higher number of control points can be supported, and may enable real-time updating of the control points. A faster and more predictable solution time also means that an acoustic field of larger volume can be controlled in comparison to known methods As will be apparent from the example described with reference to FIG. 3, embodiments of the invention may be used to provide haptic feedback. In embodiments of the invention, the term "haptic feedback" is used to mean providing tactile sensations as feedback. Haptic feedback has many applications. One example of a possible application of haptic feedback is to provide feedback within systems that may be controlled with gestures, such as computers, mobile devices or interfaces for operating controls in a car. Another application of haptic feedback is in gaming or virtual reality simulations, such as medical simulations that could be used for training for surgery. Another application of haptic feedback is in three dimensional CAD in which a user may be able to undertake three dimensional modelling in mid-air with the help of haptic feedback. Haptic feedback may also be used to provide cues to visually impaired people, for example creating Braille that is projected onto a user's hand. Another application of haptic feedback is to provide feedback for touchless buttons, indicating when such buttons have been pressed. Touchless buttons may have applications in, for example public interfaces such as ATMs for security and hygiene reasons. A further possible application for haptic feedback is in research in which it would be possible to use haptic feedback to represent microscopic objects and surfaces, to enable users to feel objects that are being researched at a microscopic scale.

Embodiments of the invention may be used for levitation of objects. For example it is sometimes advantageous to be able to experiment on samples of drugs without touching them, to avoid contamination. If the transducers are operated continuously without change, the resultant acoustic wave will have a generally constant configuration. Thus, a small object may be held within a pocket defined by a low amplitude control point that is surrounded horizontally and located vertically above high amplitude control points. A plurality of such pockets may be defined. The control points may be dynamically reassigned to independently move the small objects in three-dimensional space. Another application of using an acoustic field for levitation is in data visualisation in which a large number of small objects could be levitated in three dimensional space to represent a large data set, which would enable the data to be viewed from all angles. An advantage of the invention over known systems for levitation of small objects is that a reflector surface is not required. In some embodiments the thickness of the object may be less than one wavelength of a sound wave of the acoustic field and the width of the object may be greater than one wavelength.

Embodiments of the invention may be used in manufacturing. For example, the algorithm could be used to create targeted air flow which could be targeted at specific areas on a production line to dry surfaces quickly, speeding up manufacturing time.

Embodiments of the invention may be applied to non-destructive testing.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. A method comprising:
 i) producing an acoustic field from a transducer array having known relative positions and orientations;
 ii) defining a plurality of control points wherein each of the plurality of control points have a known spatial relationship relative to the transducer array;
 iii) assigning an amplitude to each of the plurality of control points;
 iv) computing a matrix containing elements which represent, for each of the plurality of control points, the effect that producing a modeled acoustic field having the assigned amplitude with a particular phase at that control point has on the consequential amplitude and phase of the modeled acoustic field at the other control points;
 v) calculating a plurality of eigenvectors of the matrix, each of the plurality of eigenvectors representing a set of relative phases and relative amplitudes of the modeled acoustic field at each of the plurality of control points; and
 vi) selecting one of the set of phases and relative amplitudes of the modeled acoustic field and operating the transducer array to cause at least one transducer from the transducer array to output an acoustic wave having an initial amplitude and phase such that the phases and amplitudes of the resultant acoustic field at the control points correspond to the phases and relative amplitudes of the selected set of phases and relative amplitudes of the modeled acoustic field.

2. The method of claim 1 wherein each of the plurality of eigenvectors represents scaling factors and comprise a first set of the plurality of eigenvectors and a second set of the plurality of eigenvectors,
 wherein the first set of the plurality of eigenvectors represent relatively high scaling factors when compared with the second set of the plurality of eigenvectors,
 wherein the second set of the of the plurality of eigenvectors represent relatively low scaling factors when compared with the first set of the plurality of eigenvectors,
 and further comprising selecting a set of phases and relative amplitudes with an eigenvalue corresponding to the first set of the plurality of eigenvectors.

3. The method of claim 1, wherein the effect of producing the assigned amplitude at one of the control points based on the amplitude and phases at each of the other control points is computed using a look-up function which defines how the amplitude and phase of the acoustic waves varies spatially due to attenuation and propagation.

4. The method of claim 1, further comprising a regularization step in which errors are introduced into an initial amplitude and phase output.

5. The method of claim 4 wherein the regularization step uses a weighted Tikhonov regularization.

6. The method of claim 1, wherein the power output by the transducer array is scaled such that the transducer outputting the highest of the initial amplitudes operates at substantially full power.

7. The method of claim 1, wherein the acoustic waves comprise ultrasound waves.

8. The method of claim 1, wherein the acoustic waves are modulated at a frequency between 0.1 Hz to 500 Hz.

9. The method of claim 1, wherein the plurality of control points comprise a first group of control points and a second group of control points, wherein the acoustic field has a relatively high amplitude relative to the amplitude of the acoustic field at the second group of control points, wherein the acoustic field has a relatively low amplitude relative to the amplitude of the acoustic field at the first group of control points, and wherein the first group of control points are adjacent to the second group of control points so that a gradient in amplitude of the acoustic field is produced.

10. The method of claim 9, wherein the plurality of control points comprise a group of at least one low amplitude control points may be supported by at least one high amplitude control point to define a pocket that can hold an object at the group of at least one low amplitude control points.

11. The method of claim 9, wherein the positions of at least one of the control points are chosen to define parts of a virtual three-dimensional shape within a volume within which the acoustic field may exist.

12. The method of claim 11, wherein the at least one of the control points are positioned in the region of points where an object intersects the virtual shape.

13. An apparatus for producing an acoustic field, the apparatus comprising:
an array of transducers having known relative positions and orientations;
a data processor, the data processor comprising:
a matrix containing elements representing, for each of a plurality of control points with a known spatial relationship relative to the array of transducers having an assigned amplitude, the effect that producing a modeled acoustic field having the assigned amplitude with a particular phase at that control point has on the consequential amplitude and phase of the modeled acoustic field at the other control points;
a plurality of eigenvectors of the matrix, wherein each of the plurality of eigenvectors represents a set of phases and relative amplitudes of the modeled acoustic field at the control points;
wherein the data processor is configured to cause at least one transducer from the array of transducers to output an acoustic wave, each acoustic wave having an initial amplitude and phase such that the phases and amplitudes of the resultant acoustic field at the control points correspond to the phases and relative amplitudes of a set of the plurality of eigenvectors.

14. The apparatus of claim 13 wherein a set of phases and relative amplitudes with a relatively high corresponding eigenvalue is the set of the plurality of eigenvectors.

15. The apparatus of claim 13 wherein the data processor further comprises a regulator for introducing errors into an initial amplitude and phase output by the array of transducers.

16. The apparatus of claim 15, wherein the regular used a weighted Tikhonov regularization.

17. The apparatus of claim 13 wherein the acoustic wave comprises ultrasonic frequencies.

18. The apparatus of claim 13 further comprising a modulator to modulate the acoustic waves at a frequency between 0.1 Hz to 500 Hz.

19. The apparatus of claim 13 further comprising an object tracker configured to choose positions of the plurality of control points based on the data captured by the object tracker.

* * * * *

UNITED STATES PATENT AND TRADEMARK OFFICE
CERTIFICATE OF CORRECTION

PATENT NO.         : 9,977,120 B2
APPLICATION NO.    : 14/889128
DATED              : May 22, 2018
INVENTOR(S)        : Thomas Andrew Carter et al.

It is certified that error appears in the above-identified patent and that said Letters Patent is hereby corrected as shown below:

On the Title Page

Under Abstract, please insert:
--20 Claims, 4 Drawing Sheets--

In the Claims

Column 16, Line 35-36 in Claim 1, delete "from the transducer array"

Column 18, Line 11-18 in Claim 13, delete "; wherein the data processor is configured to cause at least one transducer from the array of transducers to output an acoustic wave, each acoustic wave having an initial amplitude and phase such that the phases and amplitudes of the resultant acoustic field at the control points correspond to the phases and relative amplitudes of a set of the plurality of eigenvectors"

Column 18, Line 19-21 in Claim 14, delete "The apparatus of claim 13 wherein a set of phases and relative amplitudes with a relatively high corresponding eigenvalue is the set of the plurality of eigenvectors." and insert --The apparatus of claim 13 wherein the data processor is configured to cause at least one transducer to output an acoustic wave, each acoustic wave having an initial amplitude and phase such that the phases and amplitudes of the resultant acoustic field at the control points correspond to the phases and relative amplitudes of a set of the plurality of eigenvectors.--

Column 18, Line 22-25 in Claim 15, delete "The apparatus of claim 13 wherein the data processor further comprises a regulator for introducing errors into an initial amplitude and phase output by the array of transducers." and insert --The apparatus of claim 14 wherein a set of phases and relative amplitudes with a relatively high corresponding eigenvalue is the set of the plurality of eigenvectors.--

Column 18, Line 26-27 in Claim 16, delete "The apparatus of claim 15, wherein the regular used a weighted Tikhonov regularization." and insert --The apparatus of claim 14 wherein the data processor Signed and Sealed this
Twenty-seventh Day of August, 2019

Andrei Iancu
*Director of the United States Patent and Trademark Office*

CERTIFICATE OF CORRECTION (continued)
U.S. Pat. No. 9,977,120 B2 further comprises a regulator for introducing errors into an initial amplitude and phase output by the array of transducers.--

Column 18, Line 28-29 in Claim 17, delete "The apparatus of claim 13 wherein the acoustic wave comprises ultrasonic frequencies." and insert --The apparatus of claim 16, wherein the regular used a weighted Tikhonov regularization.--

Column 18, Line 30-32 in Claim 18, delete "The apparatus of claim 13 further comprising a modulator to modulate the acoustic waves at a frequency between 0.1 Hz to 500 Hz." and insert --The apparatus of claim 14 wherein the acoustic wave comprises ultrasonic frequencies--

Column 18, Line 33-36 in Claim 19, delete "The apparatus of claim 13 further comprising an object tracker configured to choose positions of the plurality of control points based on the data captured by the object tracker." and insert --The apparatus of claim 14 further comprising a modulator to modulate the acoustic waves at a frequency between 0.1 Hz to 500 Hz.--

Column 18, after Line 36, insert --20. The apparatus of claim 14 further comprising an object tracker configured to choose positions of the plurality of control points based on the data captured by the object tracker.--